United States Patent [19]

Brinsmead

[11] Patent Number: 5,777,619
[45] Date of Patent: *Jul. 7, 1998

[54] METHOD FOR SIMULATING HAIR USING PARTICLE EMISSIONS

[75] Inventor: Duncan R. Brinsmead, Toronto, Canada

[73] Assignee: Silicon Graphics, Inc., Mountain View, Calif.

[*] Notice: The term of this patent shall not extend beyond the expiration date of Pat. No. 5,764,233.

[21] Appl. No.: 582,070

[22] Filed: Jan. 2, 1996

[51] Int. Cl.$^6$ .................................................. G06T 15/00
[52] U.S. Cl. ........................................... 345/419; 344/430
[58] Field of Search ................................. 395/130, 126; 345/418–420, 430–433, 441–443, 952, 473–475

[56] References Cited

U.S. PATENT DOCUMENTS 5,404,426  4/1995  Usami et al. ........................... 395/120
5,500,925  3/1996  Tolson .................................... 395/131

OTHER PUBLICATIONS

Reeves, "Particle Systems—A Technique for Modeling a Class of Fuzzy Objects," ACM Transsactions on Graphics, vol. 2, No. 2, Apr. 1983, pp. 91–108.

Anjyo et al., "A Simple Method for Extracting the Natural Beauty of Hair," Computer Graphics, 26, 2, Jul. 1992, pp. 111–120.

Watanabe et al., "A trigonal prism-based method for hair image generation," IEEE Computer Graphics and Applications Magazine, vol. 12, No. 1, Jan. 1992, pp. 47–53.

Rosenblum et al., "Simulating the Structure and Dynamics of Human Hair: Modelling, Rendering and Animation," The Journal of Visualization and Computer Animation, vol. 2, No. 4, 1991, pp. 141–148, 1991.

LeBlanc, et al., "Rendering Hair using Pixel Blending and Shadow Buffers," Journal of Visualization and Computer Animation, vol., No. 3, 1991, pp. 96–110.

Fleischer, et al, "Cellular Texture Generation", ACM SIGGRAPH, Computer Graphics Proceeding, Annual Conference, pp. 230–248, Aug. 6, 1995.

Ken Perlin, "Hypertexture," ACM Computer Graphics, vol. 23, No. 3, Jul. 1989, pp. 253–262.

James T. Kajiya et al., "Rendering Fur with Three Dimensional Textures," ACM Computer Graphics, vol. 23, No. 3, Jul. 1989, pp. 271–280.

Barbara Robertson, "Hair Raising Effects," Computers Graphics World, Oct. 1995, pp. 25–30.

Georgios Sakas et al., "Extracting Surfaces from Fuzzy 3D–Ultrasound Data," ACM Computer Graphics Proceedings, SIGGRAPH '95, Aug. 1995, pp. 465–474.

Evan Hirsch, "Model and Animate with Power," Computer Graphics World, vol. 19, No. 5, pp. 77–80, May 1996.

Primary Examiner—Rudolph J. Buchel, Jr.
Attorney, Agent, or Firm—Sterne, Kessler, Goldstein & Fox PLLC

[57] ABSTRACT

A method for simulating and rendering hair. A simulator calculates the motion dynamics of a hair. The simulator includes a particle system that emits particles from a surface and a normalization module that normalizes the trajectory of each of the particles to a fixed length to form a set of normalized segments. The simulator outputs a list of normalized segments that are passed to a renderer. The renderer performs a variety of tasks, including fuzzy segment generation and self-shadowing, that results in an image being displayed on a display device. That is, the renderer takes three-dimensional spacial information, applies a light to this information and renders this information as a two-dimensional image.

8 Claims, 6 Drawing Sheets

METHOD FOR SIMULATING HAIR USING PARTICLE EMISSIONS

BACKGROUND OF THE INVENTION

1. Field of the Invention

The present invention relates generally to a system and method for generating and displaying computer images of hair, and more particularly to a system and method for simulating the motion and appearance of hair by normalizing the trajectory of a plurality of particles emitted from a surface over time.

2. Related Art

Computer graphics has improved dramatically over the last decade. The "success" of a visual simulation depends on many factors. One factor which is often singled out in computer graphics is "realism." In order to improve realism, physical models are used to simulate natural phenomena (e.g., smoke, clouds, grass, and hair) on a computer. Simulating natural phenomena is orders of magnitudes more difficult than simulation of traditional geometric objects (e.g., a house). Hair (or fur), in particular, presents a variety of problems. Hair is extremely fine, and the complexity and time required to simulate and display hair is prohibitive in modern graphics systems. In general, there is a tradeoff between computational speed and visual realism. To date, the animation of hair has only received minimal attention in the graphics community.

Attempts to model scenes with highly complex images have been made. One method is to attack the problem by brute force computing. A very early effort by Csuri, et al., "Towards an Interactive High Visual Complexity Animation System" Computer Graphics 13(2): 289–299, 1979 discussed the generation of images of smoke and fur with thousands of polygons. However, modeling hair with polygons is computationally expensive and gives rise to severe aliasing artifacts. Additionally, researches have modeled hair either by modeling each hair explicitly or by modeling the hairs as a solid texture. The latter approach is useful to model short fur-like hair. Perlin and Hoffert, "Hypertexture," ACM Computer Graphics, SIGGRAPH '89, 23(3):253–262, July 1989, directly volume rendered solid texture to depict fur. Kajiya and Kay, "Rendering Fur with Three Dimensional Textures," ACM Computer Graphics, SIGGRAPH '90, 24(4):49–57, August 1990, on the other hand, modeled fur as a distribution of microfacets and derived an illumination model from this distribution. Although the results from these techniques are impressive, they are too expensive for practical applications.

Explicit models of hair fall into two-categories. Either the hair is modeled as an opaque cylinder or as a translucent segment. The explicit cylinder model was used by Anjyo et al., "A Simple Method for Extracting the Natural Beauty of Hair," ACM Computer Graphics, SIGGRAPH '92, 26:111–120, July 1992 to render opaque thick hair. The model works well in depicting dark hair but fails to render the translucency exhibited by blonde hair for example. The latter problem has been solved using depth buffers by LeBlanc et al., "Rendering Hair using Pixel Blending and Shadow Buffers," The Journal of Visualization and Computer Animation, 2:92–97, 1991 and Rosenblum et al., "Simulating the Structure and Dynamics of Human Hair: Modeling, Rendering and Animation," The Journel of Visualization and Computer Animation, 2:141–148, 1991. Various shadowing effects are achieved by combining the various depth buffers. This latter method, however, is prone to aliasing when the number of hairs is very large. The aliasing can be avoided by either perturbing the samples or by filtering adjacent values, at the cost of loss of detail and increased computation time.

The most successful effort to render high complexity scenes are those based on particle systems (Reeves, "Particle Systems, A Technique for Modeling a Class of Fuzzy Objects," ACM Computer Graphics, SIGGRAPH '83, 17(3) :359–376, July 1983, Reeves and Blau, "Approximate and Probabilistic Algorithms for Shading and Rendering Structured Particle Systems," ACM Computer Graphics, SIGGRAPH '85, 19(3):313–322, July 1985). The success of these systems is due in part to the fact that particle systems embody the idea of rendering without geometry. Along the path of the particle system, a lighting model and a frame are used to render pixels directly rather than through a notion of detailed microgeometry. Both Anjyo et al and Rosenblum et al. model each hair strand as a flexible beam. The simulations that they present are convincing for thick hair exhibiting inertia. However, for light hair their method is computationally expensive. In addition, inter hair collisions must be calculated on a pair-wise basis and are therefore expensive.

Computationally expensive academic solutions exist, but commercial solutions to the problem of simulating hair in real-time do not. Although there have been advancements in the simulation and display of hair, real-time simulation of hair have heretofore only been achieved with a small number of hairs. Thus, what is needed is a technique for simulating hair in real-time.

SUMMARY OF THE INVENTION

The present invention is divided into two parts: simulation and rendering. A simulator calculates the motion dynamics of a hair. The simulator includes a particle system that emits particles from a surface over time and a normalization module that normalizes the trajectory of each of the particles to a fixed length. The renderer performs a variety of tasks, including fuzzy segment generation and self-shadowing, that results in an image being displayed on a display device. That is, the renderer takes three-dimensional spacial information, applies a light to this information and renders this information as a two-dimensional image.

In a preferred embodiment, a plurality of particles having a mass and a non-zero velocity are emitted from a surface over a period of time. Each timestep a particle is emitted from the same position on the surface. During each timestep, the trajectory of each particle is normalized to produce a set of normalized segments. The normalized segments are joined to simulate a hair. Consequently, particles at the root of a hair are emitted a few timesteps before the particles at the tip of the hair are emitted. That is, the tip of a hair lags behind the root of a hair. This phenomenon has been termed "lag animation." The hair is further shaped by placing it within a force field.

During rendering, the appearance and motion of a hair is modeled by creating a fuzzy segment around each normalized segment. Each consecutive pair of fuzzy segments define a single hair segment. Each fuzzy segment is assigned a density. A texture map is applied to each fuzzy segment to allow a user to create a desired hair style or fur-pattern. The present invention allows a user to view complex simulations of hair in real-time on a graphics work station.

BRIEF DESCRIPTION OF THE DRAWINGS

The foregoing and other features and advantages of the invention will be apparent from the following, more particular description of a preferred embodiment of the invention, as illustrated in the accompanying drawings.

The preferred embodiment of the invention is now described with reference to the figures where like reference numbers indicate like elements. Also in the figures, the left most digits of each reference number corresponds to the figure in which the reference number is first used.

DETAILED DESCRIPTION OF THE PREFERRED EMBODIMENTS

I. Environment of the Present Invention

Figure 1:
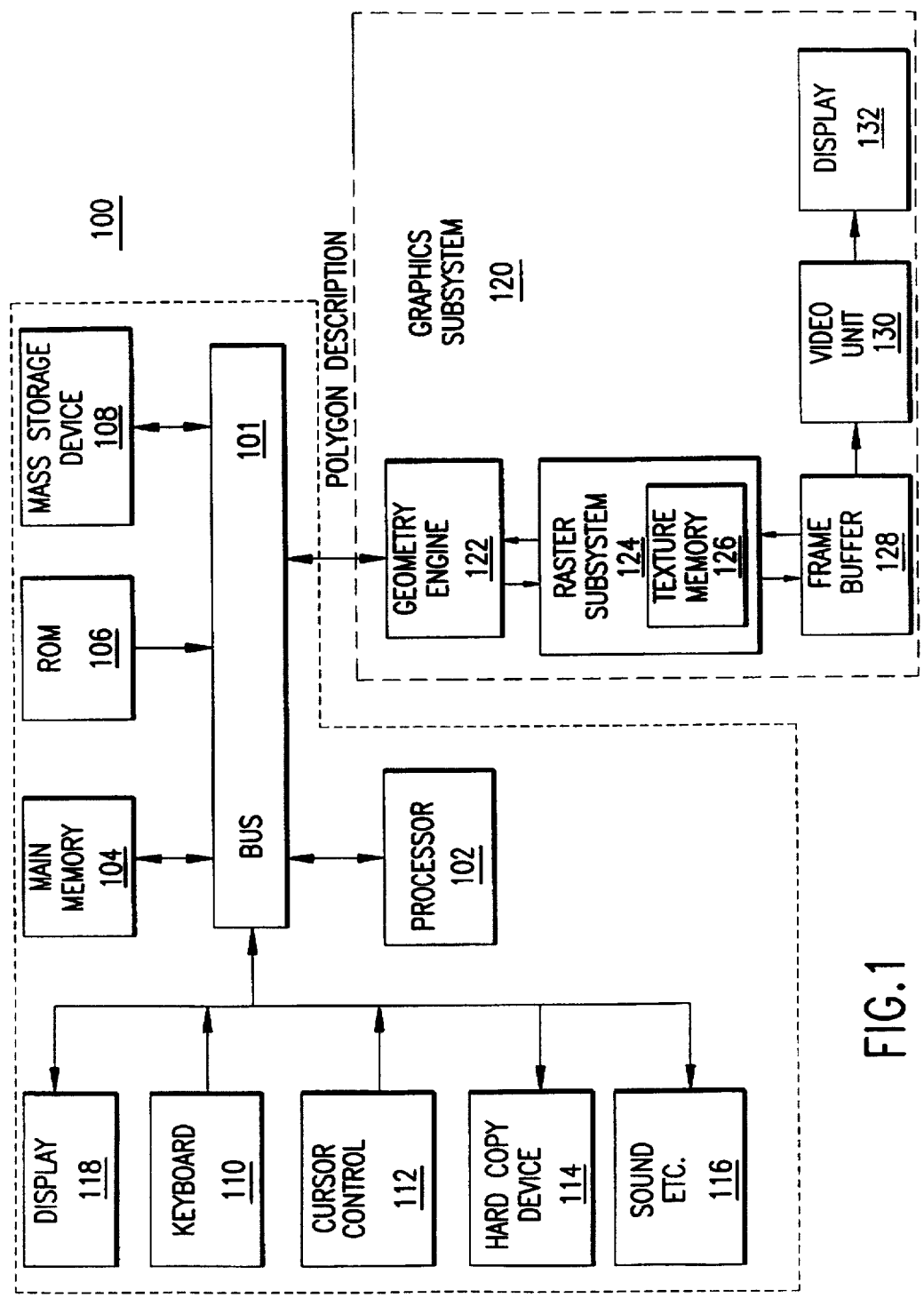
FIG. 1 is a high level block diagram of a computer system used to implement the present invention.

Referring to FIG. 1, a block diagram of a computer graphics display system 100 is shown. System 100 is exemplary only and it is not intended that the invention be limited to application in this example environment. In fact, after reading the following description, it will become apparent to a person skilled in the relevant art how to implement the invention in alternative environments. System 100 drives a graphics subsystem 120 for generating textured display images according to the present invention. In a preferred embodiment, the graphics subsystem 120 is utilized as a high-end, interactive computer graphics workstation.

System 100 includes a host processor 102 coupled through a data bus 101 to a main memory 104, read only memory (ROM) 106, and a mass storage device 108. Mass storage device 108 is used to store a vast amount of digital data relatively cheaply. For example, the mass storage device 108 can consist of one or more hard disk drives, floppy disk drives, optical disk drives, tape drives, CD ROM drives, or any number of other types of storage devices having media for storing data digitally.

Different types of input and/or output (I/O) devices are also coupled to processor 102 for the benefit of an interactive user. An alphanumeric keyboard 120 and a cursor control device 112 (e.g., a mouse, trackball, joystick, etc.) are used to input commands and information. The output devices include a hard copy device 114 (e.g., a laser printer) for printing data or other information onto a tangible medium. A sound recording or video option 116 and a display screen 118 can be coupled to the system 100 to provide for multimedia capabilities.

Graphics data is provided from processor 102 through data bus 101 to the graphics subsystem 120. The graphics subsystem 120 includes a geometry engine 122, a raster subsystem 124 coupled to a texture memory 126, a frame buffer 128, video board 130, and display 132. The present invention supplements the ALIAS software package, available from Alias/Wavefront, Toronto Canada. ALIAS is a complete system that provides tools to quickly generate 3D models, including tools to create, edit, color, light, and animate objects of images.

The present invention is preferably implemented using software executing in an environment similar to that described above with respect to FIG. 1. In this document, the term "computer program product" is used to generally refer to removable storage device 108 or ROM 106. Computer programs (also called computer control logic) are stored in ROM 106 or mass storage device 108. Such computer programs, when executed, enable the computer system 100 to perform the features and functions of the present invention as discussed herein. Accordingly, such computer programs represent controllers of the computer system 100.

Figure 6:
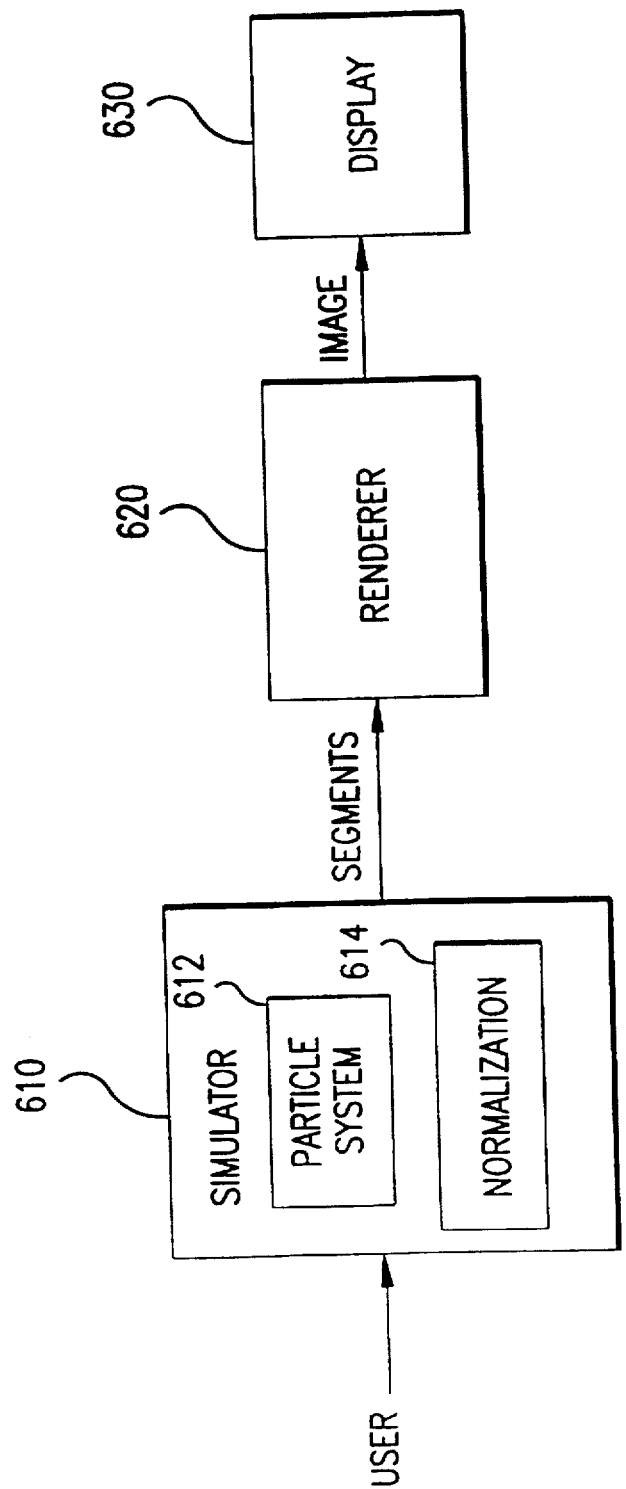
FIG. 6 illustrates a high level block diagram of a simulator and renderer.

The present invention is divided into two parts: simulation and rendering. FIG. 6 illustrates this generally. Simulator 610 calculates motion dynamics of hair. Simulator 610 includes a particle system 612 that emits particles from a surface and a normalization module 614 that normalizes the trajectory of each particle to a fixed length to create a list of normalized segments. A plurality of normalized segments form a hair, as described in greater detail below. Simulator 610 outputs the list of normalized segments to a renderer 620. Renderer 620 performs a variety of tasks, including fuzzy segment generation and selfshadowing, that results in an image being displayed on a display device 630. That is, renderer 620 takes three-dimensional spacial information, applies a light to this information and renders this information as a two-dimensional image. In a preferred embodiment, renderer 620 actively queries simulator 610 for data. For example, renderer 620 may request from simulator 610 all object states for a frame.

The particle system 612 includes a random number generator (not shown) that is used to determine particle emission locations. The random number generator is reseeded every frame (or timestep) to ensure that particles emit from the same set of locations each frame. Alternatively, a set of emission points can be generated and these points are re-used each frame.

The present invention contemplates two modes of rendering. The first mode uses graphics subsystem 120. An exemplary graphics engine that can implement the present invention is a Reality Engine available from Silicon Graphics, Mountain View, California. The first mode of operation allows real-time display of hair. The second mode of operation does not require a graphics engine. Rather, the renderer is executed as a batch process (e.g., a ray trace). This is performed by, for example, processor 102.

II. Simulation of Hair

The present invention provides a system and method for simulating hair in real-time. The present invention operates within a graphics environment that includes a particle system. Particle systems, in essence, are graphical engines implemented in either hardware or software that emit particles from a surface. Each surface may have one or more emitters associated therewith for emitting particles. Particles have physical characteristics including: mass, elasticity and friction. Mass determines how forces affect the particle. The lighter the particle, the more a force will accelerate it. The elasticity of an object determines the amount of speed damping on collision with another object. The coefficient of friction defines how much an object's speed is affected when in contact with another object.

Figure 5:
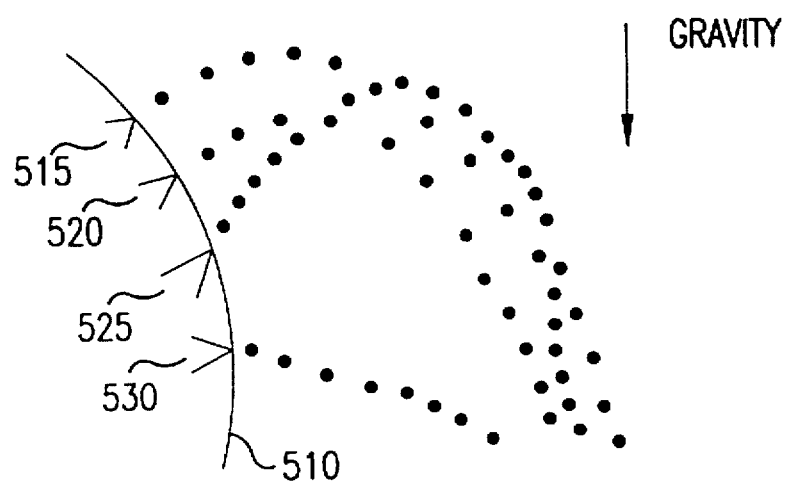
FIG. 5 illustrates a plurality of particles being emitted from a surface.

Hair can naturally be simulated using a particle system, since hair exhibits many of the same physical characteristics as a particle under atmospheric conditions. FIG. 5 illustrates this point. A surface 500 is shown having four emitters 515–530. Each emitter 515–530 represents a hair follicle. Each emitter emits a particle in a different direction from a different follicle in surface 500. The path of the particle is a function of both direction of emission, mass of the particle, initial velocity and gravity (or some other force). In this example, the path of the particles cross.

Figure 2:
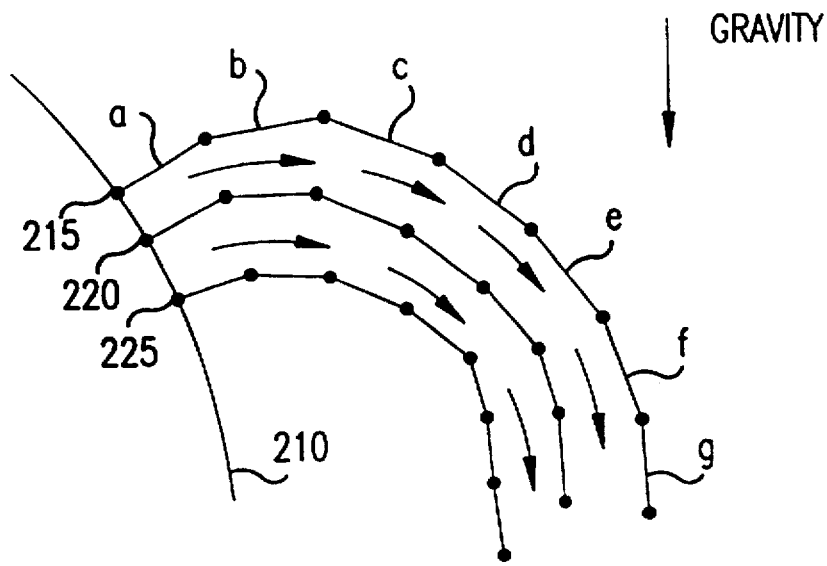
FIG. 2 illustrates the display of three hairs, each formed by a plurality of segments.

Clearly, the emission of thousands, if not millions, of these particles will simulate the appearance of hair. The path (or history) of each particle representing an individual hair. FIG. 2 illustrates an exemplary surface 210 and three hairs 215, 220, 225 being emitted from surface 210 in accordance with the present invention. Each hair includes seven segments of equal length. The segments that comprise hair 215 have been labeled with reference letters a–f. Although seven segments are shown, this is for illustrations purposes only. The present invention contemplates that a hair will be formed by any number of segments. Particles are linked to previously emitted particles to create a continuous strand of hair. The number of hairs is determined by the amount of particles emitted from surface 210 per frame. Raising this amount creates more hair. A plurality of frames are displayed on a graphical display device each second.

Figure 4:
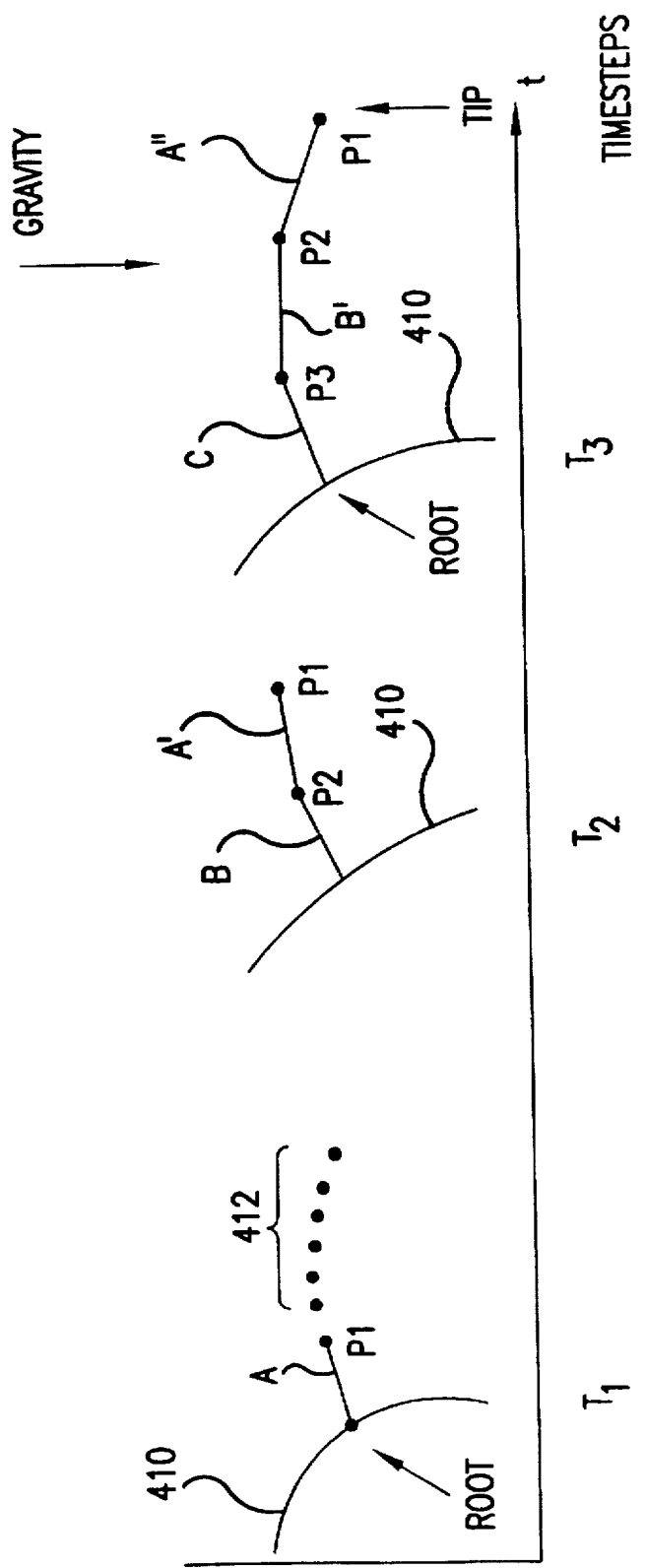
FIG. 4 illustrates secondary animation in which the tip of a hair lags behind the root of a hair.

The present invention simulates lag animation. This is illustrated generally in FIG. 4. The function of lag animation is performed by simulator 610. FIG. 4 illustrates the simulation of a hair over time. Three frames of time are designated $T_1$, $T_2$ and $T_3$. Each segment is simulated in a different timestep. In a preferred embodiment, there is only one timestep per frame. However, each frame may comprise multiple timesteps. At each timestep, the trajectory of each emitted particle (regardless of when it was emitted) is normalized. The normalized segments are then joined to simulate a hair. Consequently, a particle at the root of a hair is emitted a few timesteps before the particle at the tip of the hair is emitted. That is, the tips of a hair lag behind the roots of a hair. This phenomenon has been termed "lag animation."

In accordance with the present invention, the oldest particle (i.e., the particle that forms the last segment in the hair) will lag behind the newest particle (i.e., the particle that forms the first segment in the hair), where the lagtime (in frames) equals the number of hair segments divided by timesteps per frame. Timesteps are the number of calculations performed (or the number of segments formed) per frame. Thus, if the number of hair segments equals eight and the system performs eight calculations per frame, the hair will appear very stiff. Whereas, if the system performs one calculation per frame, the hair will flow quite freely. This feature creates the illusion of hair that grows and moves freely within the atmosphere. If an emitter is moving very quickly, the hair may have a tendency to stretch. This can be corrected by increasing the number of steps per frame, (i.e., making the hair stiffer).

Referring again to FIG. 4, a particle having a defined mass and a nonzero velocity is emitted from surface 410 during time $T_1$. In a preferred embodiment, the angle of trajectory a can be adjusted. The emitted particle, if left undisturbed, would follow a standard hyperbolic path until terminated or disturbed by another particle or a solid object (e.g., ground or a persons shoulder). However, the present invention stops the progress of the particle every timestep, thereby limiting the path of the particle to a fixed trajectory and/or distance. Formally, this technique is referred to as "normalizing" the particle. Informally, this technique is referred to as "snapping" the particle to a predefined length. Simply put, the present invention limits each particle to go a fixed distance each timestep. This distance is referred to as a hair segment or simply a segment. A plurality of hair segments form a hair.

Normalization is now described. A particle is emitted and forces (e.g., gravity) are applied to the particle. The particles inertia and momentum are calculated. Based on these values, a new position of the particle is determined for a given timestep. Next, a vector defined by this new position is determined. The vector is divided by its length and multiplied by a predefined length of a segment. This either increases or decreases the vector to a defined distance. All segments within each hair have the same length. This vector is then added onto the original position to form a hair segment, which also defines a start position of the particle for the next timestep. In a preferred embodiment, a separate variable to control inertia and mass is maintained in order to control the stiffness of the hair.

After normalization, the emission of a first particle from surface 410 forms hair segment A. Each hair segment is the path of a particle across one timestep. The path of the particle without normalization is shown with dots 412. During a second time frame $T_2$, the first particle continues on its path and a second particle is emitted from surface 410. That is, the particle that created segment A moves to a new location, which, after normalization, creates segment A'. Thereafter segment A is discarded. The emission of the second particle forms hair segment B. During a third time frame $T_3$, a third particle is emitted from surface 410 to form hair segment C. Hair segments A' and B move to a new location that is based on the natural movement of the particles, thereby creating hair segments A" and B'. All three hair segments are joined together to simulate a hair. Each strand of hair is limited to a certain number of segments, thereby fixing the length of the hair. The age of particles at the base (or root) of a hair is zero and at the tip is the maximum lifespan of the particle.

Emitted particles break apart when the emitter moves, or when external forces are applied. To solve this problem, the start timestep of a particle is set to be the end timestep of the particle that was emitted from the same location one timestep later. These two positions are not averaged together so that the hair can be generated by running the simulation the same number of steps as the hair has segments. If the end timestep of a particle was allowed to be affected by the position of other particles, then the simulation would always need to by run from the beginning of the simulation. Fur that has three segments, for example, can be generated for any frame in an animation using just three steps of the dynamic system, and yet will flow in a natural fashion when the surface is transformed.

Each strand of hair can be "stiffened" by either simulating more than one segment during a frame or by reducing the number of segments that form a strand of hair without reducing the length of the strand of hair. Stretching of the segments, because of movement of the surface, can be avoided by increasing the number of timesteps per frame. Each segment corresponds to a timestep in the simulation. If there are ten frames in the simulation, each frame having a single step, then the tip lags behind the root by ten frames. If you put all tens timesteps in a single frame, the tip will only lag behind the root by one frame thereby creating a very stiff hair. Stiffness can therefore be controlled by changing the number of timesteps per frame.

A user can adjust how finely segmented the strands of hairs are (a quality/speed tradeoff), without affecting the length of the hair. That is, the number of segments that form a hair can be decreased. The normalization of the particle path is applied to the particles position, but the velocity used for the next steps calculation is not modified.

The path of each hair is guided by a force (or motion) field. The use and implementation of force fields are generally well know in the art. In a preferred embodiment of the present invention, force fields are used to shape hair and for repulsion, albeit repulsion without friction. The force fields are illustrated generally using arrows. Essentially, forces are objects in three-dimensional spaces that define for a given point in space a direction and an intensity value. Using the force fields, a flow can be defined in three-dimensional space (e.g., a volumetric flow). Since all hairs are affected by the force fields, the hairs move in concert and tend to avoid overlapping and collision. Repulsive forces are used to handle collisions between objects. A field is created that is larger than the object the hair should avoid (e.g., a shoulder). This eliminates the need to calculate and keep track of hair on hair collisions typical with conventional systems. That is, the present invention does not rely on hair-on-hair collisions to maintain the overall shape of the hair. Essentially, the present invention requires each hair to follow well known particle dynamic principles.

Different force fields create different types of hair. For example, a set of vortex forces, which are similar to cylinders, can be used to create a molded (or bouffant) head of hair. Increasing the radial nature of these forces will curl the hair. An alternate technique is to allow the particle to curl relative to its surface by adding a rotational moment about the particles direction of trajectory. The latter method creates hairs that do not curl together. Rather, each hair has its own unique curl.

III. Rendering of a Hair

Figure 3:
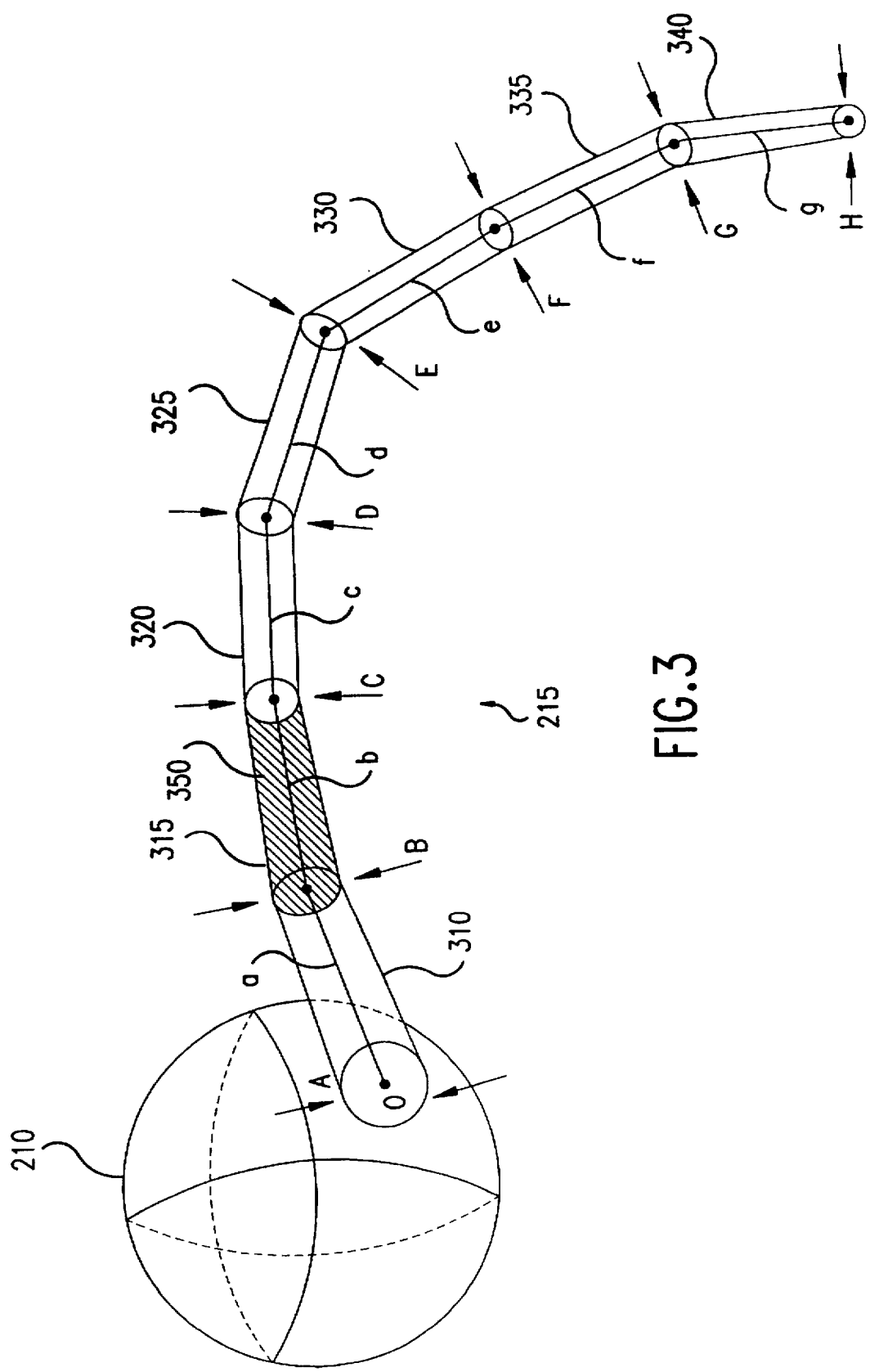
FIG. 3 illustrates the creation of fuzzy segments around each segment in a strand of hair.

Once simulator 610 generates a set of normalized segments, the present invention renders an image of the hair. FIG. 3 illustrates a preferred embodiment for rendering hair. This function is performed by renderer 620. A volume 310–340 is created around each hair segment a–g that form hair 215. Of course, a set of volumes is created for each hair emitted from surface 210. Each hair is thus modeled as a volumetric density. Modeling hair as a volumetric density exploits the spacial coherence of natural hair. That is, hairs that are next to each other tend to move and clump together.

In order to create a "volume" around each hair segment, the present invention creates a set of "fuzzy segments." A fuzzy segment is a generalization of the spherical "blob" integration technique that is described in Dr. Jos Stam's doctoral thesis entitled "Multi-Scale Stochastic Modeling of Complex Natural Phenomena," University of Toronto, published in the winter of 1995, which is hereby incorporated by reference in its entirety.

Figure 7:
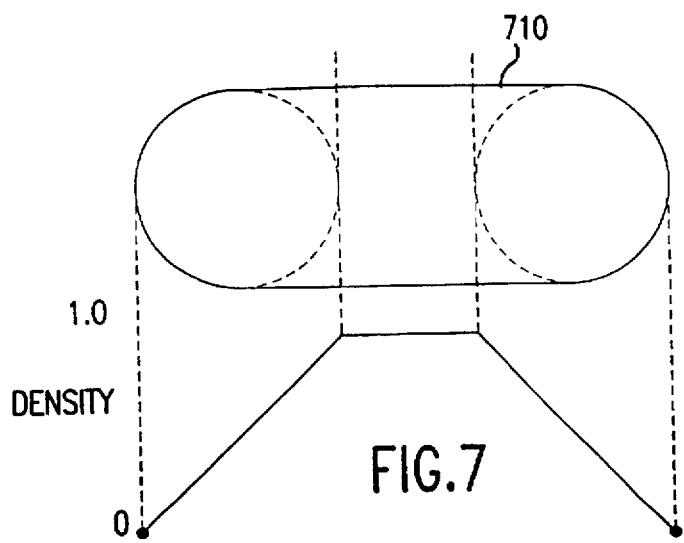
FIG. 7 illustrates the density variation within each fuzzy segment.

FIG. 7 illustrates the density of a fuzzy segment 710. Note that fuzzy segment 710 is a three-dimensional volume. The maximum density of each fuzzy segment is at the center. The density at the ends of each fuzzy volume decreases linearly until a density of zero is reached at the very edge of the fuzzy segment. Thus, when two or more fuzzy segments overlap to form a hair, the density at every point within the hair is equal.

Each fuzzy segment is tapered resulting in a tapered hair. The diameter of the end of each fuzzy segment linearly decreases. This is also illustrated in FIG. 3. Diameter "A" is greater than diameter "B", which in turn is greater than diameter "C". Diameter "H" is therefore the smallest diameter. In an alternate embodiment, the taper can linearly increase from root to tip. Each fuzzy segment is blended together to form a seamless intersection. As discussed above, each fuzzy segment is dense in the middle and transparent at its edge. Thus, the density remains constant at the overlap region of the two fuzzy segments. In an alternate embodiment, the density of the hair linearly decreases from root to tip. The present invention further contemplates varying the density from root to tip or fuzzy segment to fuzzy segment.

Unfortunately, large volumes do not look like hair. Consequently, texture mapping is used to simulate clumps of hairs. Textures change the way a surface looks by varying its appearance. Referring to FIG. 3, seven fuzzy segments 310–340 are shown. Each fuzzy segment has a texture mapped onto its surface. For example, fuzzy segment 315 is shown with cross hatched texture 350.

In a preferred embodiment, a two-dimensional noise is mapped across the hair (i.e., across each fuzzy segment). Application of a two-dimensional noise to a surface would be apparent to one skilled in the relevant art. This gives the appearance of overlapping hair. Texture is mapped from the root fuzzy segment to the tip fuzzy segment. The noise is thus continuous from root to tip. In a preferred embodiment, a different noise is used for each hair. The present invention thus maintains an index number for each hair.

In applying the two-dimensional noise, both a color modulation and a density modulation is used. As such, a viewer will see the effects of the density modulation more where the fuzzy tube is thinner. That is, hairs created by the noise function within a fuzzy segment at the tip of a hair will be more readily apparent to a viewer than hairs within a fuzzy segment at the root of hair. Clumps of hairs within a fuzzy segment at the root of a hair will appear to be more dense. In a preferred embodiment, the present invention further multiplies the color of the hair by the density difference. As such a viewer sees greater color detail variation in thick hair than in thinner portions of the hair. Thus, self-shadowing of the hair results in a viewer seeing color variation. Adjusting the aspect ratio (or uv scale) of the texture can further alter the appearance of the hair.

In a preferred embodiment of the present invention, the texture mapping is projected in eye space (i.e., the point of view of a viewers eye, also referred to as screen space). In other words, the hair texture (i.e., noise) is mapped to a two-dimensional plane cutting through the center of the fuzzy segment and always oriented perpendicular relative to the viewers eye. This technique is faster than mapping the texture to the entire fuzzy segment. This technique, however, has a tendency to create undesirable artifacts between the root fuzzy segment and the surface. In contrast, a volume that is textured smoothly intersects perfectly with the surface. Thus, in an alternate embodiment the present invention texture maps the entire fuzzy segment surface since this approach results in fewer aliasing problems (but requires more system resources to create). Additionally, each vertex of the fuzzy segments is assigned a color. Interpolation is used to smooth the color between each fuzzy segment.

The appearance of hair shares many characteristics of density fields. Indeed, light is scattered and absorbed by each hair strand. Scattering properties of a medium are characterized by its phase function p(s·s'). The scattering depends strongly on the orientation of each hair. Consequently, the phase function does not depend on the angle between the incoming and outgoing angles. A brief description used in a preferred embodiment for shadowing and illumination is provided below. However, shadowing and illumination of hair is well beyond the scope of the present invention. Furthermore, shadowing and illumination is well known in the art. The present invention contemplates using any known, or future developed, technique for shadowing and illuminating hair. For a general discussion of shadowing and illumination see, Stam, "Multi-Scale Stochastic Modeling of Complex Natural Phenomena," University of Toronto, published in the winter of 1995.

Figure 8:
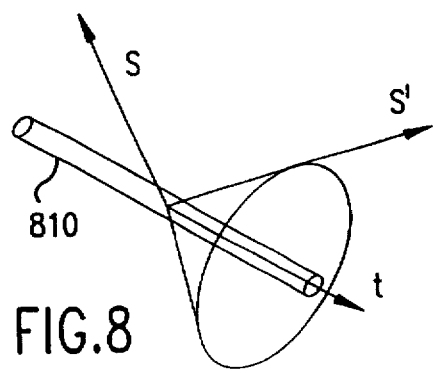
FIG. 8 illustrates that the intensity reflected from a hair approximates a cone.

Hair is visible because each hair strand both reflects and refracts light. The effects of refraction and multiple reflections can be modeled as the scattering of light within a density field of hairs. This model is, however, not complete, since highly directional reflections from hair are often visible. This effect is particularly apparent for greased hair. Referring to FIG. 8, it is assumed that the width of each hair strand 810 is thin and that the distribution of reflected light due to the incoming intensity coming from a direction s is equal to the "reflected cone" aligned with the direction t of hair 810. This is equivalent to adding a term $P_{spec}$ to the phase function which depends on the direction of hair strand 810:

$$p_{spec}(s \cdot s^1, t) = p^{spec} \delta(s^1 \cdot t - (-s \cdot t)) = p^{spec} \delta((s^1 + s) \cdot t) \quad (1)$$

Consequently, the shooting operations from surfaces and light sources to the fuzzy segments that form hair 810 have to be changed accordingly. Each hair is represented as a density field defined around a segment $z_v = z_0 + vt$:

$$H(x) = W(dist_H(x), \sigma),$$

where $dist_H$ gives the shortest distance to the hair segment and $W$ is a smoothing kernel. The point closest on the segment (assuming the direction t is normalized) is equal to the projection of the vector $x - z_0$ onto the segment:

$$z_{closest} = z_0 + ((x - z_0) \cdot t) t$$

In the case when this point does not lie within the hair segment, $z_{closest}$ is one of the endpoints of the segment. Consequently, the distance is equal to:

$$d_H(x) = |(x - z_0) + ((x - z_0) \cdot t) t|$$

An integration method to compute the transparency due to an ensemble of such fuzzy segments is provided below.

In order to compute the optical depth due to a single fuzzy segment along a ray $x_u = x_0 + us$, the following integral has to be calculated:

$$\Gamma(a, b) = \int_a^b W(d_H(x_u), \sigma) du$$

Figure 9:
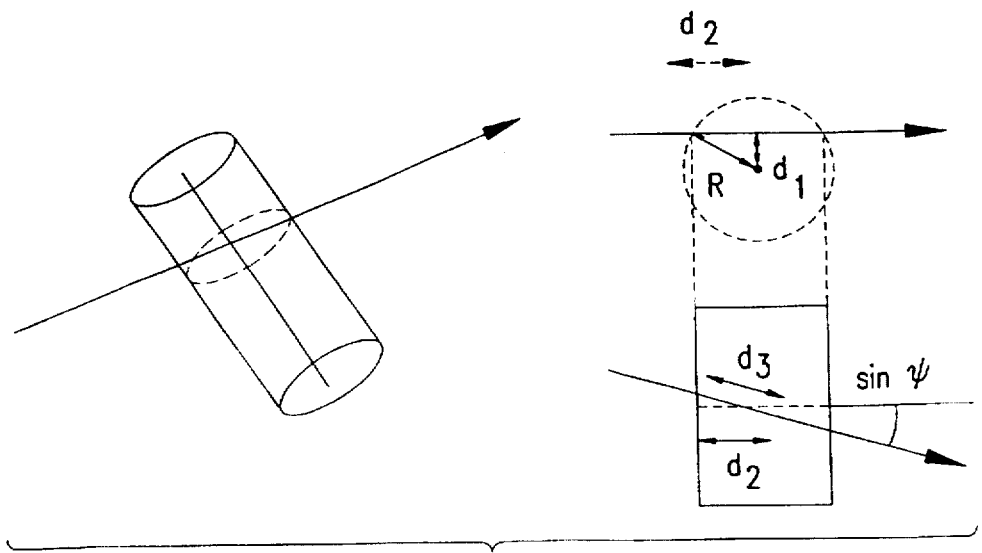
FIG. 9 illustrates the geometry of the integration of a fuzzy segment along a ray.

We approximate this integral by $$\Gamma(a, b) \approx \frac{b-a}{R} \cdot \frac{d_3}{R} W(d_1, \sigma)$$

where $d_1$ is the shortest distance of the ray to the fuzzy segment, $d_3$ is the half-distance that the ray traverses through the truncated fuzzy segment (see FIG. 9) and $u^*$ is the closest point on the ray to the fuzzy segment. The shortest distance to the fuzzy segment is calculated by the condition that the difference between the ray and the segment $x_u - z_v$ has to be orthogonal to both the direction of the ray and the direction of the fuzzy segment:

$$(x_u - z_v) \cdot s = 0 \text{ and } (x_u - z_v) \cdot t = 0$$

Solving for u and v, one obtains:

$$u^* = (x_0 - z_0) \cdot \frac{s - (s \cdot t)t}{1 - (s \cdot t)^2}$$

The denominator $1 - (s \cdot t)^2$ vanishes when the ray and the segment are aligned and in this case the shortest distance is given by $d_1 = |x_0 - z_{closest}|$ for example. In general, the closest distance is then given by $d_1 = |x_{u^*} - z_v^*|$. From the geometry of FIG. 9, it follows that the distance along the ray is given by $$d_3 = \frac{d_2}{\sin \psi} = \frac{\sqrt{R^2 - d_1^2}}{\sin \psi}$$

where R is the radius of the truncated fuzzy segment and $\Psi$ is the angle between the direction of the segment and the direction of the ray, and hence $$\sin \psi = \sqrt{1 - (s \cdot t)^2}$$

The optical depth due to many fuzzy segments is obtained by summing up the contributions of each of them.

The hair segments are illuminated in a pre-pass phase, with the resulting color cached on each segment vertex. This color is interpolated across the segment at render time using the v parameter. During the prepass phase, shadow feelers are fired from each segment vertex towards each light. By accumulating the total density of fuzzy segments that intersect the shadow feeler, the degree of self shadowing of the hair can be determined. To simulate multiple scattering effects with minimal computations, the present invention makes the simplification of assuming that the light scatters along the same direction. The degree of this totally directional scattering is controlled with a translucency parameter. The translucence parameter simply scales the transparency of the fuzzy segments during the prepass illumination phase. The more translucence, the more light can pass through the hairs. Shadowing due to other objects are also calculated for the shadow feelers. The integration of the source intensity is then similar to the one for the blobs described in Stam, infra, section 5.3.2.

A hardware implementation of the present invention could calculate shadowing by rendering a depth map for each light. The depth map would be used during the prepass phase instead of shadow feelers. The rendering of the illuminated hair can then be done by converting each fuzzy segment into a splat that uses hardware transparency and color mapping. The splat is flat, polygonal profile of the tube, flattened along the viewing vector.

It should be understood that embodiments of the present invention can be implemented in hardware, software or a combination thereof In such embodiment, the various component and steps would be implemented in hardware and/or software to perform the functions of the present invention. Any presently available of future developed computer software language and/or hardware components can be employed in such embodiments of the present invention. In particular, the flow charts discussed above can be especially useful for creating the software embodiments.

While the invention has been particularly shown and described with reference to preferred embodiments thereof, it will be understood by those skilled in the art that various changes in form and details may be made therein without departing from the spirit and scope of the invention.

What is claimed is:

1. A computer based method for simulating hair, comprising the steps of:

(1) emitting a plurality of particles from a single point on a surface, each of said particle having a mass and a non-zero velocity, wherein said plurality of particles are emitted sequentially in time;

(2) normalizing each of said plurality of particles to form a set of normalized segments, whereby each normalized segment is a fixed length; and (3) joining said set of normalized segments to simulate a hair, whereby the segment at the tip of said hair lags behind the segment at the root of said hair.

2. The computer based method of claim 1, further comprising repeating step (1) through (3) for additional points on said surface.

3. The computer based method of claim 2, further comprising randomly adjusting the angle of trajectory for each point on said surface.

4. The computer based method of claim 1, further comprising the step of adjusting the length of each of said segments to adjust the stiffness of said hair.

5. The computer based method of claim 1, further comprising the step of shaping said hair with a force field.

6. The computer based method of claim 5, further comprising a method of rendering said shaped hair.

7. The computer based method of claim 1, further comprising emitting each of said plurality of particles by adding a rotational moment about each of said particles' direction of trajectory to thereby allow each of said particles to curl relative to said surface.

8. The computer based method of claim 1, further comprising a method of rendering said simulated hair.

* * * * *